UNITED STATES PATENT OFFICE.

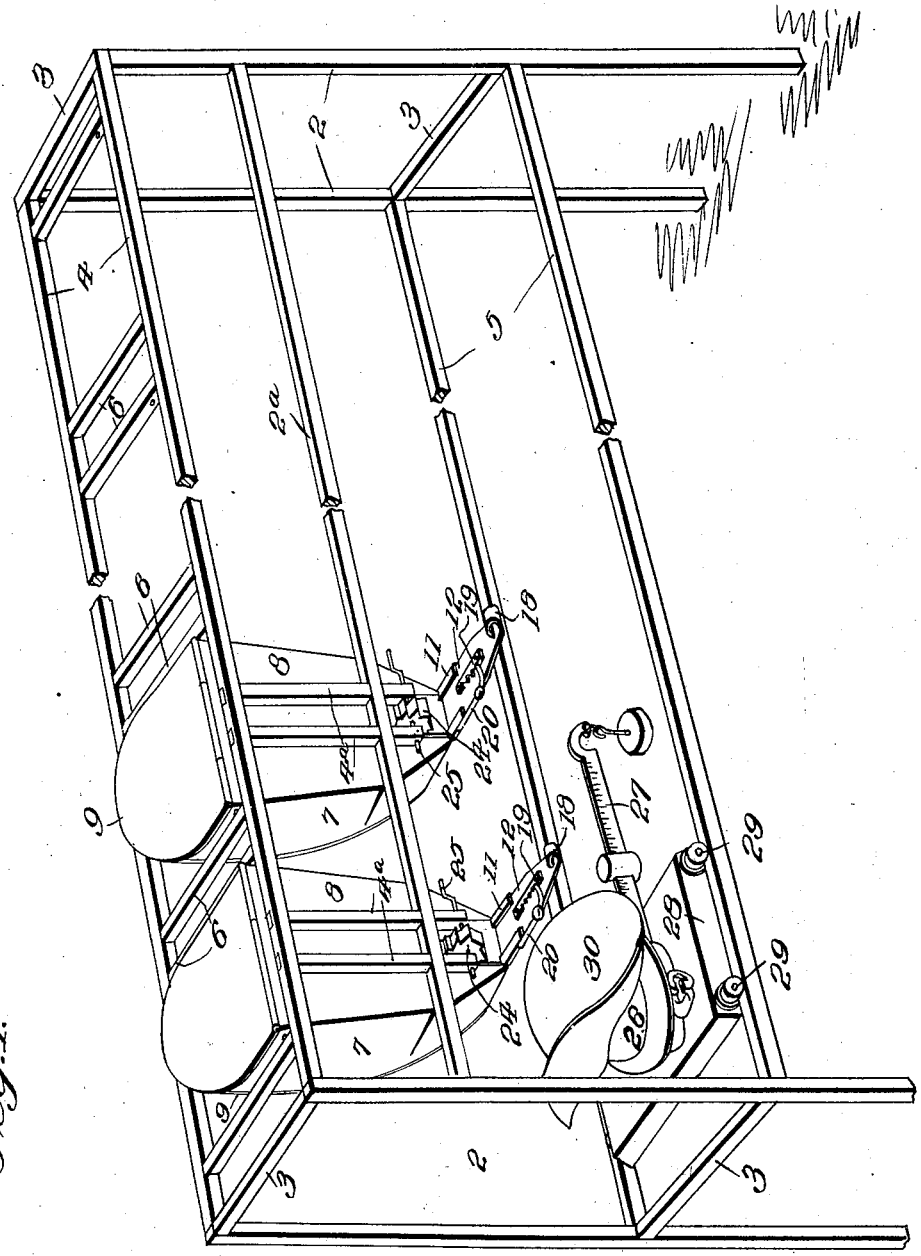

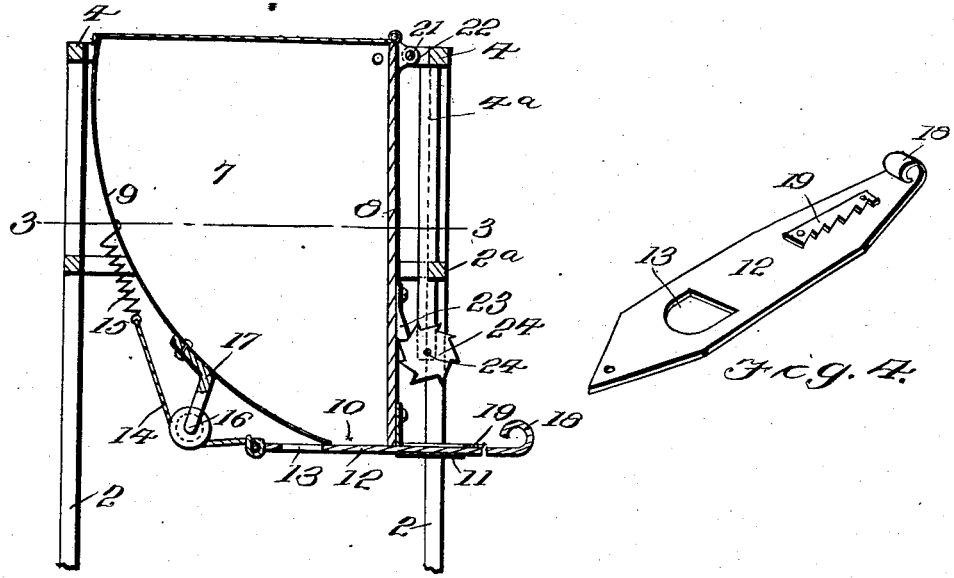
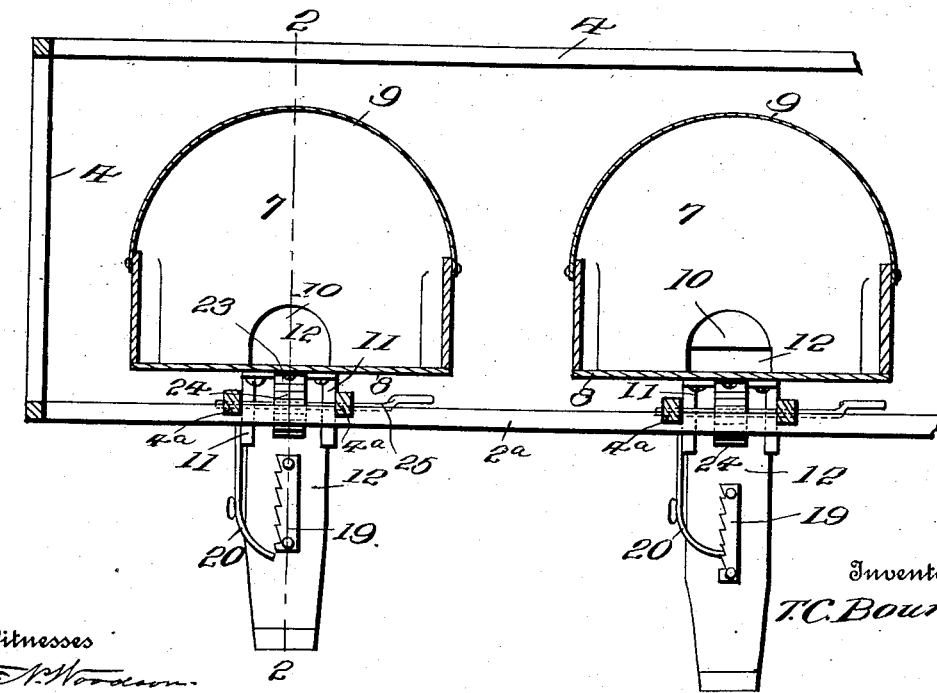

THOMAS C. BOUNDS, OF WAHALAK, MISSISSIPPI.

DISPENSING APPARATUS.

1,014,115.  Specification of Letters Patent.  Patented Jan. 9, 1912.

Application filed February 18, 1911. Serial No. 609,478.

*To all whom it may concern:*

Be it known that I, THOMAS C. BOUNDS, citizen of the United States, residing at Wahalak, in the county of Kemper and State of Mississippi, have invented certain new and useful Improvements in Dispensing Apparatus, of which the following is a specification.

My invention relates to dispensing apparatus and particularly to an apparatus for dispensing commodities such as coffee, rice, sugar, flour, etc.

The primary object of the invention is the provision of a very simple and effective dispensing device particularly convenient for use by grocers and like dealers, and particularly designed for dispensing granular or pulverulent commodities and filling them into paper bags or into the pan of a weighing scale.

The apparatus includes to this end a longitudinally extending frame which may be conveniently mounted upon a counter and supports a plurality of hopper-like containers for the commodities, each container being provided with a regulatable discharge valve or gate at its lower end. Below the series of hoppers is supported a longitudinally extending bracket, upon which is mounted a carriage having thereon a weighing scale of any ordinary or usual construction, the carriage being shiftable along the track so that the scale may be moved into position beneath any one of the hoppers.

The invention is shown in the accompanying drawings wherein:

Figure 1 is a perspective view of my apparatus. Fig. 2 is a cross section on the line 2—2 of Fig. 3. Fig. 3 is a cross section on the line 3—3 of Fig. 2. Fig. 4 is a detail view of the valve.

Corresponding and like parts are referred to in the following description and indicated in all the views of the accompanying drawings by the same reference characters.

Referring to these figures, it will be seen that the frame of my apparatus comprises the oppositely disposed pairs of uprights 2 which are connected, preferably by cross braces 3. Supported upon the upper ends of the pairs of uprights 2 are the longitudinally extending frame bars 4, upon which the hoppers 7 are mounted. Supported beneath the hoppers 7 are the longitudinally extending track bars 5 upon which the weighing scales are shiftably mounted.

The upper pair of parallel frame bars 4 are connected to each other by pairs of transverse braces 6, between each pair of which a hopper is mounted. There are as many hoppers as may be desired and depending entirely upon the length of the frame or the number of commodities to be dispensed. All of the hoppers are alike and hence a description of one hopper and its mode of mounting is applicable to all of the hoppers. Each hopper 7 is preferably flat on one side as at 8 and the other side 9 is upwardly and outwardly curved. I do not wish of course to be limited to this exact form of hopper. Each hopper has a hinged cover. The lower end of the hopper at the junctions of the flat and curved sides is provided with a discharge opening 10, the passage of material through which is controlled by a sliding valve or gate 12 moving in guides 11 and attached in any suitable manner to the lower end of the hopper.

The gate 12 is provided with a semicircular opening 13 which is of the same size as the opening 10 and is adapted to register therewith. At one end the slide or gate 12 is connected by a flexible connection 14 to a spring 15, the flexible connection passing over a roller 16 mounted on a bracket 17. The spring is shown as a contractile spring and acts through the flexible connection to urge the gate or slide 12 to its closed position. The outer end of the gate or slide 12 is provided with a finger piece 18 whereby the gate may be easily manipulated.

One side of the gate is provided with the toothed bar 19 with which a spring detent 20 engages so as to hold the gate in any desired open position. There are a number of teeth on the bar 19 so that the gate may be opened to any desired amount and held in adjusted position. The amount that the gate will be opened, or in other words, the area of the discharge opening will be governed by the size of the bag or paper into which the commodity is to be discharged or will depend upon the nature of the commodity itself. When the spring detent 20 is released, the spring 15 will act to close the gate or slide and prevent any further discharge of the commodity.

In order that the material within the hopper may be readily discharged from the hopper, I preferably support the hopper at its upper end, leaving the lower end of the hopper free to move, and provide means whereby the lower end of the hopper may be oscillated or jarred so as to shake the commodity down within the hopper. As illustrated, each hopper is mounted upon a cross bolt 21 which is supported in bearings 22 attached to the adjacent frame bar 4. The lower portion of the hopper is provided with a projecting tooth 23 which is engaged by a toothed wheel 24 mounted upon a shaft 25 having a cranked handle whereby the shaft may be rotated. This shaft is preferably mounted upon depending supports 4ª attached at their upper ends to the rods 4 and at their lower ends supported upon a longitudinally extending frame bar 2ª. It will be obvious that by rotating this cranked handle, the hopper will be jarred or oscillated and the material shaken down and out through the discharge opening.

Mounted upon the tracks 5 in any suitable manner is a pair of weighing scales 26 of any desired construction but shown as being provided with a scale beam 27 and the usual weights. The scale, however, might be a spring scale without departure from the spirit of the invention. The weighing device 26 is provided with a carriage 28 or like supporting means, this carriage being provided with wheels 29 which engage with the tracks 5 so as to hold the carriage supported upon the tracks to permit the carriage and the scale to be moved longitudinally along the frame in position beneath any one of the hoppers 7. This weighing device is provided with the usual means whereby a receptacle such as a bag or the scale pan 30 may be supported.

The operation of my invention will be obvious from what has gone before. When it is desired to dispense a commodity contained in any one of the hoppers, the scale is shifted upon the track to a position beneath the proper hopper. A paper bag may be then held beneath the mouth of the hopper and the slide or gate 12 opened to a proper degree. The commodity then passes into the bag until the bag is filled to a sufficient amount, whereupon the spring 20 is released from its engagement with the toothed bar 19 and the slide or valve 12 closes. The bag may be then lowered onto the pan of the scales and the amount in the bag weighed, or the bag may be placed upon the scales and the scales moved beneath any desired hopper and the material allowed to drop into the bag as it rests upon the scales. If the commodity comes out too slowly from the hopper, it is only necessary to turn the crank shaft 25 and jar the hopper. Each hopper is of course provided with a lid 30, preferably hinged at its front end so that the hopper may be filled and its contents renewed when desired.

It will be seen that my invention forms a very convenient dispensing apparatus which does not interfere with the ordinary use of the counter and which eliminates the necessity of the clerk first filling the bag from a bin and then carrying the filled bag to the weighing scales. There may be of course as many scales placed upon the track 5 as necessary, depending entirely upon the length of the frame, the number of hoppers and the number of clerks.

It will be obvious that another advantage resident in my apparatus is that as the material is dispensed, fresh goods may be placed in the upper portion of each hopper, thus causing the relatively stale goods to be used first but keeping a constant supply of fresh goods on hand.

What I claim is:

1. In a dispensing apparatus a supporting frame, a receptacle having a discharge opening, a movable closure for said opening, means for supporting said receptacle for swinging movement upon said frame, a wheel having radial teeth and mounted for rotation upon said frame, and means for rotating said wheel to cause its teeth to successively engage the receptacle and impart a jarring motion thereto.

2. In a dispensing apparatus a receptacle having a discharge opening, a closure mounted for slidable movement upon said receptacle for opening and closing said discharge opening, means for maintaining said closure yieldably in closed position, a member having spaced notches and connected to said closure, and a pawl carried by said receptacle in position to engage said notches.

3. In a dispensing apparatus a receptacle having a discharge opening, means for mounting said receptacle for swinging movement, means for imparting a jarring movement to said receptacle, a closure mounted for slidable movement upon said receptacle for opening and closing said discharge opening, means for maintaining said closure yieldably in closed position, a member having spaced notches and connected to said closure, and a pawl carried by said receptacle in position to engage said notches.

4. A dispensing apparatus, including a support and frame, a plurality of hoppers pivotally mounted on the supporting frame at their upper ends, the lower ends of the hoppers being free to oscillate, a gate at the lower end of each hopper whereby the discharge of its contents may be regulated, a tooth on the lower end of each hopper, a toothed wheel for each hopper engaging the tooth thereon, and means for rotating each toothed wheel independently of the others.

In testimony whereof, I affix my signature in presence of two witnesses.

THOMAS C. BOUNDS. [L. S.]

Witnesses:
J. C. COVERT,
L. L. DEMLING.